United States Patent
Liou et al.

(10) Patent No.: US 7,218,664 B2
(45) Date of Patent: May 15, 2007

(54) METHOD AND SYSTEM OF PATH GAIN ESTIMATION IN A WCDMA SYSTEM

(75) Inventors: Ming-Luen Liou, Zhonghe (TW); Sung-Chiao Li, Yonghe (TW)

(73) Assignee: Via Technologies Inc., Taipei (TW)

( * ) Notice: Subject to any disclaimer, the term of this patent is extended or adjusted under 35 U.S.C. 154(b) by 503 days.

(21) Appl. No.: 10/802,957

(22) Filed: Mar. 17, 2004

(65) Prior Publication Data
US 2005/0089111 A1    Apr. 28, 2005

(51) Int. Cl.
*H04B 1/00* (2006.01)
(52) U.S. Cl. .................. 375/140; 375/144; 375/146; 375/147
(58) Field of Classification Search ............ 375/267, 375/347, 140, 130, 144, 148, 146, 147; 370/342, 370/441, 335; 455/101, 132–139
See application file for complete search history.

(56) References Cited

U.S. PATENT DOCUMENTS 6,611,675 B1 * 8/2003 Salonen et al. ............ 455/69

2002/0131382 A1 * 9/2002 Kim et al. ................. 370/335

OTHER PUBLICATIONS

"Performance Analysis of Space-Time Transmit Diversity for WCDMA" Jun. 2001; pp. 29-33.

* cited by examiner

*Primary Examiner*—Tesfaldet Bocure
(74) *Attorney, Agent, or Firm*—Thomas, Kayden, Horstemeyer & Risley

(57) ABSTRACT

A method of path gain estimation for a downlink WCDMA system. The present invention further provides a system for realizing the path gain estimation method. A transmitting device of the system comprises a first and a second antenna to transmit signals with the space time transmit diversity (STTD) scheme. The first and second antennas transmit common pilot channel (CPICH) symbols that are orthogonal to each other, and the CPICH symbols are received by a single antenna of a receiving device. The receiving device then determines the path gain by a STTD filter coefficient determination process, which includes a block selection process for selecting a combination of the CPICH symbol and a tap gain determination process for determining equations for estimating the path gain of the system.

21 Claims, 10 Drawing Sheets

METHOD AND SYSTEM OF PATH GAIN ESTIMATION IN A WCDMA SYSTEM

BACKGROUND OF THE INVENTION

1. Field of the Invention

The present invention relates generally to downlink communication systems operating in the presence of multi-path fading, and more particularly, to a method of path gain estimation in a WCDMA system.

2. Description of the Related Art

In mobile communication, the multi-path phenomena of propagated media results in serious fading when transmitted signals are de-constructively added or interfered by other electromagnetic waves transmitted at the same time. Serious signal fading causes the receivers unable to recover the signals properly.

The efficiency of a mobile communication is highly influenced by the channel condition and the transmission environment. Direct-sequence spread spectrum mobile communication systems, such as IS-95, CDMA2000, and WCDMA communication systems often use a RAKE receiver to cope with the multi-path propagation channel, and to cooperate with the handover (hand-off) mechanism of the communication between the mobile station and the base stations. FIG. 1 shows a block diagram of a conventional RAKE receiver used in a spread spectrum system.

The receiving scheme must first confirm the existence of the transmission paths. The receiver then detects the strong and stable signals within the transmission paths, and assigns the signals to corresponding fingers for demodulation. The receiver estimates and tracks the relative delay time of the corresponding transmission paths by a path searching and delay tracking block 102 as shown in FIG. 1. The delay compensation 108 of each finger in the RAKE receiver compensates the propagation delay of the corresponding path. The signal of each finger is despreaded in a dispreading gain compensation block 104, and rotated by a phase angle corresponding to a negative amount of phase rotation introduced by the channel. Subsequent to rotation, signals of each finger are in phase and can be added together. Finally, the path gains and the rotation angles of each finger are estimated by the path gain estimation algorithm in the coder & gain estimation blocks 106 and RAKE combining & SINR estimation block 110.

Generally speaking, there is at least one designated pilot channel in a downlink channel of a mobile communication system in order to reduce the hardware complexity of mobile terminals. The pilot channel provides a phase reference to the mobile terminals within the service area. The base station assigns and sends a phase reference via the pilot channel when a connection is made, thus the mobile terminal does not have to determine the phase reference independently. This is the hypothesis for the path gain estimation algorithm.

The STTD (Space time transmit diversity) scheme has been proposed in the 3GPP specification for use as a next generation mobile system standard. In the STTD scheme, a transmitting device, such as a base station, comprises at least two antennas located apart from each other in a space diversity arrangement.

A signal as shown in FIG. 2(a) originally comprises four bits b0, b1, b2 and b3 in a block, and the signal is encoded into two mutually orthogonal sequences after STTD encoding. For example, the STTD encoder encodes the block (b0, b1, b2, b3) into a first block (b0, b1, b2, b3) for antenna #0, and a second block (−b2, b3, b0, −b1) for antenna #1 as shown in FIG. 2(a). The two STTD encoded blocks transmit through antenna #0 and antenna #1 respectively at the same time. The WCDMA (Wideband Code Division Multiple Access) system uses QPSK (Quadrature Phase Shift Keying) modulation, where two bits are modulated into one symbol. In FIG. 2(b), there are two complex symbols S1 and S2 in a block, which is identical to the input block in FIG. 2(a), as S1 corresponds to bits b0 and b1 and S2 corresponds to bits b2 and b3. FIG. 2(b) shows the STTD encoded process symbolically, wherein the input block of the STTD encoder is (S1, S2), and the output blocks are (S1, S2) and (−S2*, S1*). The notation * represents the complex conjugate of a complex number. If a channel is STTD encoded, the primary common pilot channel (P-CPICH) is specified as the phase reference. The two mutual orthogonal sequences transmitted by two different antennas will both be picked up by the corresponding mobile terminal.

Furthermore, if the complex path gains of antenna #0 and antenna #1 are assumed to be h0, and h1 respectively, the following equations may be derived:

$$r_0 = s_0 h_0 - s_1^* h_1 \quad (1)$$

$$r_1 = s_1 h_0 + s_0^* h_1 \quad (2)$$

$$\begin{pmatrix} r_0 \\ r_1 \end{pmatrix} = \begin{pmatrix} s_0 & -s_1^* \\ s_1 & s_0^* \end{pmatrix} \begin{pmatrix} h_0 \\ h_1 \end{pmatrix}$$

$$\begin{pmatrix} r_0^* \\ r_1 \end{pmatrix} = \begin{pmatrix} h_0^* & -h_1^* \\ h_1 & h_0 \end{pmatrix} \begin{pmatrix} s_0^* \\ s_1 \end{pmatrix}$$

The complex symbols S0 and S1 transmitted in the pilot sequence are known by both the transmitter and the receivers before transmission. The received values r0 and r1 are obtained by despreading the signal transmitted in the pilot channel. The path gains h0 and h1 are thus estimated by solving the simultaneous equations (1) and (2).

Once the path gains h0 and h1 are obtained from the information sent by the pilot channel, simultaneous equations for estimating symbols carried in the data channel can be derived. The symbols transmitted in the data channel can be obtained by substituting the corresponding received values r0 and r1 into the simultaneous equations. The RAKE receiver then combines the symbols acquired from each receiving path, and outputs the combined data to a channel decoder.

The arrangement of transmitted bits in the primary-CPICH (P-CPICH) and secondary-CPICH(S-CPICH) of the WCDMA system is shown in FIG. 4. This design treats the two QPSK symbols s0 and s1 in a data block as the same symbol, i.e. s0=s1, thus further simplifying the path gain estimation calculation.

As shown in FIG. 3(a), each radio frame contains 15 time slots, and each time slot carries 10 symbols. FIG. 3(b) illustrates the modulation pattern of the symbols transmitted through antenna 1 and antenna 2, where A=1+j. As shown in FIG. 5, a block type STTD path gain estimation process first divides the data blocks into two different block types. Each data block contains two QPSK symbols, equivalent to 4 bits of data. The patterns of block type #0 and block type #1 are shown in FIG. 5, and these two block types are transmitted alternatively. The example in FIG. 5 is identical to the example in FIGS. 3 and 4 as symbol A in FIG. 3 represents binary bits (00) and symbol −A represents binary bits (11).

According to the gray-encoding rule, the bit pair (11) corresponds to a QPSK symbol −s0 if the bit pair (00) corresponds to a QPSK symbol S0. Furthermore, if the path gains of the two antennas are assumed to be constant during the transmission of each data block, the relationship between the received values (r0, r1) and the path gains (h0, h1) of the two antennas within the time interval of transmitting block type #0 is expressed in Equations (3) and (4).

$$r_0 = h_0 \cdot s_0 + h_1 \cdot s_0 \quad (3)$$

$$r_1 = h_0 \cdot s_0 - h_1 \cdot s_0 \quad (4)$$

Similarly, the relationship between the received values (r0, r1) and the path gains (h0, h1) of the two antennas within the time interval of transmitting block type #1 is expressed in Equations (5) and (6).

$$r_0 = h_0 \cdot s_0 - h_1 \cdot s_0 \quad (5)$$

$$r_1 = h_0 \cdot s_0 = h_1 \cdot s_0 \quad (6)$$

According to the above equations (3), (4), (5) and (6), the path gains h0 and h1 of antenna #0 and antenna #1 respectively can be determined after receiving the pilot symbol. Then the STTD encoded data transmitted in the data channel can hence be decoded according to equations (1) and (2).

In order to reduce the noise of the transmitted signals, each of the pass gain sequences h0 and h1 of the two antennas passes into a low pass filter respectively. The cutoff frequency of the low pass filters is higher than the sum of the maximum carrier frequency offset and the maximum Doppler frequency.

The previously described path gain estimation method however has several shortcomings when implemented in mobile terminal.

The path gain estimation method of the related art is not suitable for mobile terminals as they are not constant, but vary with time due to rapid movement, thus the assumption of constant path gains in the related art introduces enormous errors.

The path gain estimation method of the related art is unfavorable when a mismatch occurs between the carrier frequency of the transmitter (ie. base station) and the carrier frequency of the receiver (ie. mobile terminal). The block type STTD path gain estimation method produces serious jitters when the carrier frequency is shifted beyond an acceptable level (for example, 0.1 ppm).

Another drawback of the related art is the high cost of hardware implementation, since low pass filters are required in the path gain estimation to reduce noise.

As a result of the shortcomings found in the related art, an improved method of time-variant path gain estimation and a system thereof are provided in the present invention.

SUMMARY OF THE INVENTION

It is an objective of the present invention to provide a downlink communication system operating in the presence of multi-path, and more particularly, to a method of path gain estimation in a WCDMA system.

Put simply, the invention presents a method of path gain estimation for a downlink WCDMA system in an STTD (Space Time Transmit Diversity) scheme. CPICH (Common Pilot Channel) symbols are encoded into a first pilot symbol sequence and a second pilot symbol sequence according to the STTD scheme, and the two sequences are transmitted by a first antenna and a second antenna respectively. A third antenna at the receiving end receives signals, and then the received signals are decoded and despreaded into received CPICH symbols. Path gains are estimated by a STTD filter coefficient determination process comprising a block selection process for selecting a combination of the received CPICH symbols and a tap gain determination process for determining weighted values for the received CPICH symbols.

Four symbol sets with a common time spacing b ($s0_a$, $s1_a$; $s0_{a+b}$, $s1_{a+b}$; $s0_{a+2b}$, $s1_{a+2b}$; $s0_{a+3b}$, $s1_{a+3b}$) corresponding to four received CPICH symbols ($r_a$, $r_{a+b}$, $r_{a+2b}$, $r_{a+3b}$) are selected, wherein (a, a+b, a+2b, a+3b) represent timing indices of the symbols, $s0_0$, $s0_1$, $s0_2$, ... represent the first pilot symbol sequence transmitted by the first antenna, and $s1_0$, $s1_1$, $s1_2$, ... represent the second pilot symbol sequence transmitted by the second antenna. Simultaneous equations can be derived according to the selected symbol sets. The selection of symbol sets must follow the rule of selecting particular weighted values, so that these weighted values are orthogonal to each other. Finally, the path gains can be estimated by solving the simultaneous equations. The solutions of the simultaneous equations are (h0, h1, Δ0, Δ1), wherein (h0, h1) represent average transmitted path gains, and (2Δ0, 2Δ1) represent path gain increments of two consecutive symbols. The simultaneous equations are:

$$r_a = s0_a \times (h0 - 3\Delta 0) + s1_a \times (h1 - 3\Delta 1) = s0_a \times h0 - 3s0_{a+b} \times \Delta 0 + s1_a \times h1 - 3s1_a \times \Delta 1$$

$$r_{a+b} = s0_{a+b} \times (h0 - \Delta 0) + s1_{a+b} \times (h1 - \Delta 1) = s0_{a+b} \times h0 - s0_{a+b} \times \Delta 0 + s1_{a+b} \times h1 - s1_{a+b} \times \Delta 1$$

$$r_{a+2b} = s0_{a+2b} \times (h0 + \Delta 0) + s1_{a+2b} \times (h1 + \Delta 1) = s0_{a+2b} \times h0 + s0_{a+2b} \times \Delta 0 + s1_{a+2b} \times h1 + s1_{a+2b} \times \Delta 1$$

$$r_{a+3b} = s0_{a+3b} \times (h0 + 3\Delta 0) + s1_{a+3b} \times (h1 + 3\Delta 1) = s0_{a+3b} \times h0 + 3s0_{a+3b} \times \Delta 0 + s1_{a+3b} \times h1 + 3s1_{a+3b} \times \Delta 1$$

After solving the above simultaneous equations, the tap gain determination process also comprises maintaining a constant sum of the weighted values for the received CPICH symbols, assigning a simple constant or an integer to each weighted value for reducing computational complexity, and setting the weighted values to compensate the path gain estimation jitter caused by carrier frequency offsets.

The present invention also provides a system of path gain estimation for a downlink WCDMA system using the STTD scheme. The path gain estimation system comprises a transmitting device, a receiving device, a block selection unit, and a tap gain determination unit. The transmitting device has an STTD encoder for encoding CPICH symbols into a first and a second pilot symbol sequences, a first antenna for transmitting the first pilot symbol sequence, and a second antenna for transmitting the second pilot symbol sequence. A third antenna of the receiving device receives signals and a STTD decoder decodes and despreads the signals into received CPICH symbols. The block selection unit selects a combination of the received CPICH symbols for constructing simultaneous equations. The tap gain determination unit computes weighted values of the simultaneous equations according to the path gain estimation method of the present invention.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Antenna diversity, i.e. space diversity, is a communication system with multiple antennas on the receiver or transmitter. Antenna diversity is a practical technology widely used in wireless communication to overcome the multi-path fading channel problem.

The present invention provides a method of path gain estimation for wireless communication systems in the presence of multi-path fading. The present invention has the advantages of low latency, and robust under fast fading or large carrier frequency offset (CFO) conditions.

First Embodiment

Figure 8:
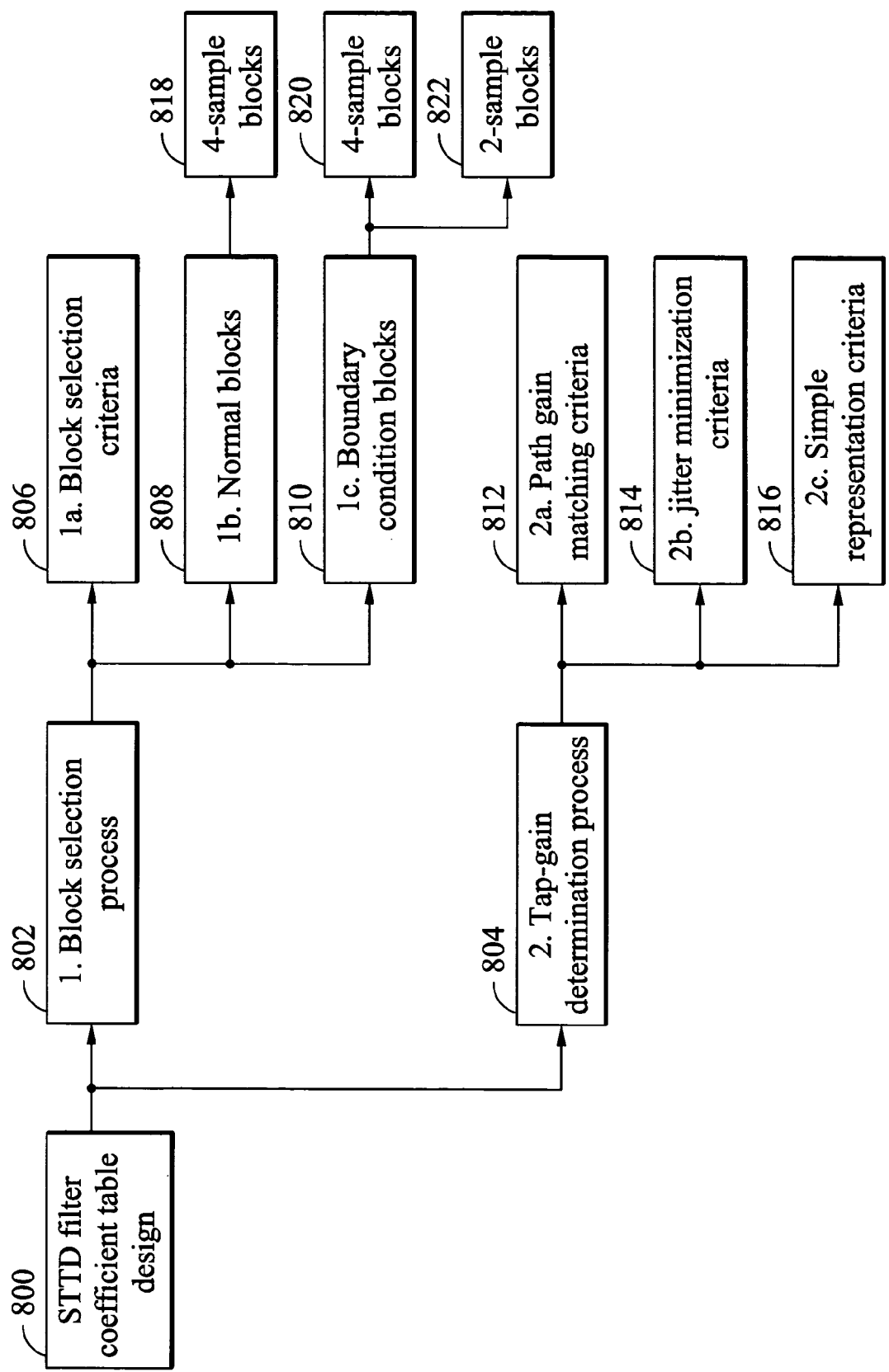
FIG. 8 is a process flow diagram for determining the STTD filter coefficient table of the present invention.

FIG. 8 shows a process flow diagram of the present invention for determining the STTD filter coefficient table in order to obtain the path gain estimation. The method of the present invention mainly includes two processes, block selection process 802 and tap gain determination process 804. The details of the two processes are described in the following.

The block selection process 802 is used to select a proper combination of CPICH symbols for estimating the path gain and determining the formula for path gain estimation.

The first step of the block selection process 802 is to determine the block selection criteria 806. If the transmitted symbols of antenna #0 are assumed to be $s0_0, s0_1, s0_2, \ldots$ and the transmitted symbols of antenna #1 are assumed to be $s1_0, s1_1, s1_2, \ldots$, four consecutive symbols from each antenna ($s0_a, s1_a; s0_{a+b}, s1_{a+b}; s0_{a+2b}, s1_{a+2b}; s0_{a+3b}, s1_{a+3b}$) can be chosen corresponding to four received symbols ($r_a, r_{a+b}, r_{a+2b}, r_{a+3b}$). Note that the consecutive symbols are equally separated with a particular time interval b.

If the average path gains of transmission are (h0, h1), and the increments between two path gains with the time interval b apart are (2Δ0, 2Δ1), then simultaneous equations (1—1), (1-2), (1-3) and (1-4) can be derived.

$$r_a = s0_a \times (h0 - 3\Delta 0) + s1_a \times (h1 - 3\Delta 1) \quad (1-1)$$
$$= s0_a \times h0 - 3s0_a \times \Delta 0 + s1_a \times h1 - 3s1_a \times \Delta 1$$

$$r_{a+b} = s0_{a+b} \times (h0 - \Delta 0) + s1_{a+b} \times (h1 - \Delta 1) \quad (1-2)$$
$$= s0_{a+b} \times h0 - s0_{a+b} \times \Delta 0 + s1_{a+b} \times h1 - s1_{a+b} \times \Delta 1$$

$$r_{a+2b} = s0_{a+2b} \times (h0 + \Delta 0) + s1_{a+2b} \times (h1 + \Delta 1) \quad (1-3)$$
$$= s0_{a+2b} \times h0 + s0_{a+2b} \times \Delta 0 + s1_{a+2b} \times h1 + s1_{a+2b} \times \Delta 1$$

$$r_{a+3b} = s0_{a+3b} \times (h0 + 3\Delta 0) + s1_{a+3b} \times (h1 + 3\Delta 1) \quad (1-4)$$
$$= s0_{a+3b} \times h0 + 3s0_{a+3b} \times \Delta 0 + s1_{a+3b} \times h1 + 3s1_{a+3b} \times \Delta 1$$

The selection rule of symbol time points (a, a+b, a+2b, a+3b) is to choose a and b to make the coefficients of h0, Δ0, h1, Δ1 in the simultaneous equations of (1-1), (1-2), (1-3) and (1-4) orthogonal to each other. The property of the orthogonal pair is the product is zero, hence multiplying any two of [$s0_a, s0_{a+b}, s0_{a+2b}, s0_{a+3b}$], [$-3s0_a, -s0_{a+b}, s0_{a+2b}, 3s0_{a+3b}$], [$s1_a, s1_{a+b}, s1_{a+2b}, s1_{a+3b}$] and [$-3s1_a, -s1_{a+b}, s1_{a+2b}, 3s1_{a+3b}$], the result will be zero.

Table 1 shows four kinds of block selection types in the present invention. The given example selects b=1, then substitutes the received symbols ($r_a, r_{a+b}, r_{a+2b}, r_{a+3b}$) and known pilot symbol patterns ($s0_a, s1_a; s0_{a+b}, s1_{a+b}; s0_{a+2b}, s1_{a+2b}; s0_{a+3b}, s1_{a+3b}$) into the simultaneous equations (1-1), (1-2), (1-3) and (1-4) to solve the coefficients h0, Δ0, h1, Δ1. The time-variable channel response equations can hence be determined by weighting the received signals $r_a, r_{a+b}, r_{a+2b}$, and $r_{a+3b}$ when the coefficients h0, Δ0, h1, Δ1 are found.

TABLE 1

| | | | | | | | | | | CPICH channel estimation scheme A Delay line requirement: 6-taps Channel estimation delay: 3 symbols |
|---|---|---|---|---|---|---|---|---|---|---|
| | CPICH QPSK symbol | | Pilot symbol delay line (6-taps) | | | | | | | f0 = 5D4 + 12D3 + 9D2 − 2D1<br>f1 = −2D6 + 10D4 + 12D3 + 10D1 − 6D0<br>f2 = 2D5 + 12D3 + 16D2 − 6D1<br>f3 = −6D5 + 14D4 + 12D3 + 10D1 − 6D0<br>f4 = −6D6 + 10D5 + 12D3 + 14D2 − 6D1<br>f5 = −6D5 + 16D4 + 12D3 + 2D1 |
| Slot/ symb# | Ant. #0 | Ant. #1 | D0 (IN) | D1 | D2 | D3 | D4 | D5 | D6 | f6 = −6D6 + 10D5 + 12D3 + 10D2 − 2D0<br>f7 = −2D5 + 9D4 + 12D3 + 5D2 |
| (Last frame) 14 | | | | | | | | | | |
| 6 | S | −S | P1 | P2 | P3 | P4 | P5 | P6 | P7 | H0 P6 + 3P4 + 2P3    3P4 + 6P3 − 3P2    3P4 + 6P3 − 3P2<br>H1 P6 − 3P4 + 2P3    −3P4 + 6P3 − 3P2    −3P4 + 6P3 − 3P2 |
| 7 | S | S | R0 | P1 | P2 | P3 | P4 | P5 | P6 | H0 −3P5 + 6P4 + 3P3    −3P5 + 6P4 + 3P3    2P4 + 3P3 + P1<br>H1 3P5 − 6P4 + 3P3    3P5 − 6P4 + 3P3    −2P4 + 3P3 − P1 |
| 8 | S | S | R1 | R0 | P1 | P2 | P3 | P4 | P5 | H0 P2 + P1    −6P5 + 9P4 + 3P2    P4 + 3P2 + 2P1 |

TABLE 1-continued

| | | | | | | | | | | | | |
|---|---|---|---|---|---|---|---|---|---|---|---|---|
| 9 | S | −S | R2 | R1 | R0 | P1 | P2 | P3 | P4 | H1 P2 − P1<br>H0 P2 + P1<br>H1 P2 − P1 | 6P5 − 9P4 + 3P2<br>P1 + R0<br>−P1 + R0 | −P4 + 3P2 − 2P1<br>−3P3 + 6P2 + 3P1<br>−3P3 + 6P2 − 3P1 |
| 0 | | | | | | | | | | | | |
| 0 | S | S | R3 | R2 | R1 | R0 | P1 | P2 | P3 | H0 3R0 + 6R1 − 3R2<br>H1 3R0 − 6R1 + 3R2 | P1 + R0<br>−P1 + R0 | R0 + R1<br>R0 − R1 |
| 1 | S | −S | R4 | R3 | R2 | R1 | R0 | P1 | P2 | H0 2R0 + 3R1 + R3<br>H1 2R0 − 3R1 + R3 | 3R1 + 9R3 − 6R4<br>−3R1 + 9R3 − 6R4 | R0 + R1<br>R0 − R1 |
| 2 | S | −S | R5 | R4 | R3 | R2 | R1 | R0 | P1 | H0 R0 + 3R2 + 2R3<br>H1 R0 − 3R2 + 2R3 | 3R2 + 6R3 − 3R4<br>−3R2 + 6R3 − 3R4 | 3R2 + 6R3 − 3R4<br>−3R2 + 6R3 − 3R4 |
| 3 | S | S | R6 | R5 | R4 | R3 | R2 | R1 | R0 | H0 −3R1 + 6R2 + 3R3<br>H1 3R1 − 6R2 + 3R3 | −3R1 + 6R2 + 3R3<br>3R1 − 6R2 + 3R3 | 2R2 + 3R3 + R5<br>−2R2 + 3R3 − R5 |
| 4 | S | S | R7 | R6 | R5 | R4 | R3 | R2 | R1 | H0 3R4 + 6R5 − 3R6<br>H1 3R4 − 6R5 + 3R6 | −6R1 + 9R2 + 3R4<br>6R1 − 9R2 + 3R4 | R2 + 3R4 + 2R5<br>−R2 + 3R4 − 2R5 |
| 5 | S | −S | R8 | R7 | R6 | R5 | R4 | R3 | R2 | H0 2R4 + 3R5 + R7<br>H1 2R4 − 3R5 + R7 | 3R5 + 9R7 − 6R8<br>−3R5 + 9R7 − 6R8 | −3R3 + 6R4 + 3R5<br>−3R3 + 6R4 − 3R5 |
| 6 | S | −S | R9 | R8 | R7 | R6 | R5 | R4 | R3 | H0 R4 + 3R6 + 2R7<br>H1 R4 − 3R6 + 2R7 | 3R6 + 6R7 − 3R8<br>−3R6 + 6R7 − 3R8 | 3R6 + 6R7 − 3R8<br>−3R6 + 6R7 − 3R8 |
| 7 | S | S | R10 | R9 | R8 | R7 | R6 | R5 | R4 | H0 −3R5 + 6R6 + 3R7<br>H1 3R5 − 6R6 + 3R7 | −3R5 + 6R6 + 3R7<br>3R5 − 6R6 + 3R7 | 2R6 + 3R7 + R9<br>−2R6 + 3R7 − R9 |
| 8 | S | S | R11 | R10 | R9 | R8 | R7 | R6 | R5 | H0 3R8 + 6R9 − 3R10<br>H1 3R8 − 6R9 + 3R10 | −6R5 + 9R6 − 3R8<br>6R5 − 9R6 − 3R8 | R6 + 3R8 + 2R9<br>−R6 + 3R8 − 2R9 |
| 9 | S | −S | R12 | R11 | R10 | R9 | R8 | R7 | R6 | H0 2R8 + 3R9 + R11<br>H1 2R8 − 3R9 + R11 | 3R9 + 9R11 − 6R12<br>−3R9 + 9R11 − 6R12 | −3R7 + 6R8 + 3R9<br>−3R7 + 6R8 − 3R9 |
| 1 | | | | | | | | | | | | |
| 0 | S | −S | R13 | R12 | R11 | R10 | R9 | R8 | R7 | H0 R8 + 3R10 + 2R11<br>H1 R8 − 3R10 + 2R11 | 3R10 + 6R11 − 3R12<br>−3R10 + 6R11 − 3R12 | 3R10 + 6R11 − 3R12<br>−3R10 + 6R11 − 3R12 |
| 1 | S | S | R14 | R13 | R12 | R11 | R10 | R9 | R8 | H0 −3R9 + 6R10 + 3R11<br>H1 3R9 − 6R10 + 3R11 | −3R9 + 6R10 + 3R11<br>3R9 − 6R10 + 3R11 | 2R10 + 3R11 + R13<br>−2R10 + 3R11 − R13 |
| 2 | S | S | R15 | R14 | R13 | R12 | R11 | R10 | R9 | H0 3R12 + 6R13 − 3R14<br>H1 3R12 − 6R13 + 3R14 | −6R9 + 9R10 + 3R12<br>6R9 − 9R10 + 3R12 | R10 + 3R12 + 2R13<br>−R10 + 3R12 − 2R13 |
| 3 | S | S | R16 | R15 | R14 | R13 | R12 | R11 | R10 | H0 2R12 + 3R13 + R15<br>H1 2R12 − 3R13 + R15 | 3R13 + 9R15 − 6R16<br>−3R13 + 9R15 − 6R16 | −3R11 + 6R12 + 6R13<br>−3R11 + 6R12 + 6R13 |

CPICH channel estimation scheme B
Delay line requirement: 4-taps
Channel estimation delay: 1 symbols
Fa = −4D3 + 10D2 + 12D1 + 6D0
Fb = 6D2 + 12D1 + 6D0
Fc = −3D4 + 15D2 + 12D1
Fd = 2D3 + 12D1 + 10D0
Fe = −12D3 + 24D2 + 12D1
Ff = −12D4 + 20D3 + 12D1 + 4D0

Slot/symb#

(Last frame) 14

| | | | |
|---|---|---|---|
| 6 | −6P7 + 9P6 + 3P4<br>−6P7 + 9P6 − 3P4 | P4 + P3<br>−P4 + P3 | A: $\bar{H}0 = 14$ $\bar{H}1 = \bar{H}0 − 24D3$<br>B: $\hat{H}0 = Ff$ $\hat{H}1 = −(\hat{H}0 − 24D1)$ |
| 7 | Discarded | P4 + P3<br>−P4 + P3 | A: $\bar{H}0 = 15$ $\bar{H}1 = −(\bar{H}0 − 24D3)$<br>B: $\hat{H}0 = Fa$ $\hat{H}1 = \hat{H}0 − 24D1$ |
| 8 | 4P2 + 6P1 − 2R1<br>4P2 − 6P1 + 2R1 | P2 + P1<br>−P2 − P1 | A: $\bar{H}0 = 16$ $\bar{H}1 = −(\bar{H}0 − 24D3)$<br>B: $\hat{H}0 = Fb$ $\hat{H}1 = −(\hat{H}0 − 24D1)$ |
| 9 | 2P2 + 4P1 + 2R0<br>2P2 − 4P1 + 2R0 | P2 + P1<br>P2 − P1 | A: $\bar{H}0 = 17$ $\bar{H}1 = \bar{H}0 − 24D3$<br>B: $\hat{H}0 = Fc$ $\hat{H}1 = \hat{H}0 − 24D1$ |
| 0 | | | |
| 0 | 2P1 + 4R0 + 2R1<br>−2P1 + 4R0 − 2R1 | R0 + R1<br>R0 − R1 | A: $\bar{H}0 = 10$ $\bar{H}1 = −(\bar{H}0 − 24D3)$<br>B: $\hat{H}0 = Fd$ $\hat{H}1 = \hat{H}0 − 24D1$ |
| 1 | −2P2 + 6R0 + 4R1<br>−2P2 + 6R0 − 4R1 | R0 + R1<br>R0 − R1 | A: $\bar{H}0 = 11$ $\bar{H}1 = \bar{H}0 − 24D3$<br>B: $\hat{H}0 = Fe$ $\hat{H}1 = −(\hat{H}0 − 24D1)$ |
| 2 | Discarded | R2 + R3<br>−R2 + R3 | A: $\bar{H}0 = 12$ $\bar{H}1 = \bar{H}0 − 24D3$<br>B: $\hat{H}0 = Ff$ $\hat{H}1 = −(\hat{H}0 − 24D1)$ |
| 3 | 3R3 + 9R5 − 6R6<br>3R3 − 9R5 + 6R6 | R2 + R3<br>−R2 + R3 | A: $\bar{H}0 = 13$ $\bar{H}1 = −(\bar{H}0 − 24D3)$<br>B: $\hat{H}0 = Fe$ $\hat{H}1 = \hat{H}0 − 24D1$ |
| 4 | 3R4 + 6R5 − 3R6<br>3R4 − 6R5 + 3R6 | R4 + R5<br>R4 − R5 | A: $\bar{H}0 = 14$ $\bar{H}1 = −(\bar{H}0 − 24D3)$<br>B: $\hat{H}0 = Ff$ $\hat{H}1 = \hat{H}0 − 24D1$ |
| 5 | −3R3 + 6R4 + 3R5<br>−3R3 + 6R4 − 3R5 | R4 + R5<br>R4 − R5 | A: $\bar{H}0 = 13$ $\bar{H}1 = \bar{H}0 − 24D3$<br>B: $\hat{H}0 = Fe$ $\hat{H}1 = −(\hat{H}0 − 24D1)$ |
| 6 | −6R3 + 9R4 + 3R6<br>−6R3 + 9R4 − 3R6 | R6 + R7<br>−R6 + R7 | A: $\bar{H}0 = 14$ $\bar{H}1 = \bar{H}0 − 24D3$<br>B: $\hat{H}0 = Ff$ $\hat{H}1 = −(\hat{H}0 − 24D1)$ |
| 7 | 3R7 + 9R9 − 6R10<br>3R7 − 9R9 + 6R10 | R6 + R7<br>−R6 + R7 | A: $\bar{H}0 = 13$ $\bar{H}1 = −(\bar{H}0 − 24D3)$<br>B: $\hat{H}0 = Fe$ $\hat{H}1 = \hat{H}0 − 24D1$ |
| 8 | 3R8 + 6R9 − 3R10<br>3R8 − 6R9 + 3R10 | R8 + R9<br>R8 − R9 | A: $\bar{H}0 = 14$ $\bar{H}1 = −(\bar{H}0 − 24D3)$<br>B: $\hat{H}0 = Ff$ $\hat{H}1 = \hat{H}0 − 24D1$ |
| 9 | −3R7 + 6R8 + 3R9 | R8 + R9 | A: $\bar{H}0 = 13$ $\bar{H}1 = \bar{H}0 − 24D3$ |

TABLE 1-continued

| | | −3R7 + 6R8 − 3R9 | R8 − R9 | B: $\hat{H}0 = Fe\,\hat{H}1 = -(\hat{H}0 - 24D1)$ |
|---|---|---|---|---|
| 1 | | | | |
| | 0 | −6R7 + 9R8 + 3R10 | R10 + R11 | A: $\overline{H}0 = 14\,\overline{H}1 = \overline{H}0 - 24D3$ |
| | | −6R7 + 9R8 − 3R10 | −R10 + R11 | B: $\hat{H}0 = Ff\,\hat{H}1 = -(\hat{H}0 - 24D1)$ |
| | 1 | 3R11 + 9R13 − 6R14 | R10 + R11 | A: $\overline{H}0 = 13\,\overline{H}1 = -(\overline{H}0 - 24D3)$ |
| | | 3R11 − 9R13 + 6R14 | −R10 + R11 | B: $\hat{H}0 = Fe\,\hat{H}1 = \hat{H}0 - 24D1$ |
| | 2 | 3R12 + 6R13 − 3R14 | R12 + R13 | A: $\overline{H}0 = 14\,\overline{H}1 = -(\overline{H}0 - 24D3)$ |
| | | 3R12 − 6R13 + 3R14 | R12 − R13 | B: $\hat{H}0 = Ff\,\hat{H}1 = \hat{H}0 - 24D1$ |
| | 3 | −3R11 + 6R12 + 3R13 | R12 + R13 | A: $\overline{H}0 = 13\,\overline{H}1 = \overline{H}0 - 24D3$ |
| | | −3R11 + 6R12 − 3R13 | R12 − R13 | B: $\hat{H}0 = Fe\,\hat{H}1 = -(\hat{H}0 - 24D1)$ |

The, symbol arrangements of the block types in the transmitted data sequences in the present invention that are different from each other cross the data frame boundary. Thus an exceptional process for path estimation is required. A random time point a, and a time interval b (time unit for b is 256 chip timing) are selected in order to pick up four CPICH symbols. The coefficient characteristic of the four CPICH symbols is examined to see if the requirements in step 806 can be fulfilled. Once a set of symbols satisfies requirements in step 806, the symbol set is declared as belonging to one type of data block, and can be used to derive the equations for path gain estimation. If the calculating results of the path gain estimation for two data blocks are the same, these two data blocks are defined as having the same block type. If the data block of the same block type does not cross the data frame boundary, it is called a normal block type. If the data block of the same block type crosses the data frame boundary, it is called a boundary condition block type. AS shown in the example in Table 1, if b=1, there are five kinds of block types for a data block comprising four symbols, wherein only one of these block types belongs to the boundary condition block type, the rest are normal block types. The two-symbol data block of the related art, however does not have this kind of boundary condition problem.

The four-symbol data block type or two-symbol data block type of the present invention can be used to estimate the path gain, and the result of estimation is similar to the result obtained using the conventional method. The design of the present invention however further includes the tap gain determination process in order to consider other effects.

The path gain matching criteria in step 812 restricts the sum of the weighted values (coefficient of the symbols) for the received signals to be constant, in order to maintain the path gain estimation.

The objective of step 816 is to simplify the hardware implementation by reducing the complexity of computation. The computation can be simplified by assigning a simple constant, or an integer to each weighted value.

The weighted values of the received signal are set for compensating the path gain estimation jitter caused by the carrier frequency offset in step 814.

Generally speaking, a four-symbol data block is better than a two-symbol data block because the two-symbol data block has the path gain estimation jitter problem. The four-symbol data block however is not suitable for data near frame boundaries so the two-symbol data block is used in the data around frame boundaries instead of the four-symbol data block.

If the symbol time is long and a carrier frequency mismatch exists between the base station and the mobile terminal, or the mobile terminal is moving at high speed, phase rotation will occur when the input signal multiplies the PN code according to the correct timing.

The present invention combines the symbol despreading method with the STTD decoding process, which is suitable for applications of coherent integration time of symbol despreading in a spread spectrum system, and situations when the path gain varies obviously during an STTD decoded data block period. Wherein the hypothesis is that the symbol synchronization and the frame synchronization are achieved, and a set of path gains (h0, h1) is determined in each symbol time.

If the data channel for demodulation is operated in STTD mode, the system processes the input of each finger according to the rules described in the following.

If the symbol time is equal or longer than the coherent integration time of symbol despreading, then the corresponding data block (d0, d1) of the received signal is divided into 2N portions, $r_0, r_1, \ldots, r_{2N-1}$. The corresponding estimated path gains of the transmitted signal are $h0_0, h0_1, \ldots, h0_{2N-1}$ for antenna #0 and $h1_0, h1_1, \ldots, h1_{2N-1}$ for antenna #1. The data symbols can hence be approximated according to the following equations:

$$d0 \propto \sum_{x=0}^{N-1} [(|h0_{N+x}|^2 h0_x + |h1_x|^2 h0_{N+x})^* \cdot r_x +$$
$$(|h0_{N+x}|^2 h1_x + |h1_x|^2 h1_{N+x}) \cdot r_{N+x}^*]$$

$$d1 \propto \sum_{x=0}^{N-1} [-(|h0_x|^2 h1_{N+x} + |h1_{N+x}|^2 h1_x) \cdot r_x^* +$$
$$(|h0_x|^2 h0_{N+x} + |h1_{N+x}|^2 h0_x)^* \cdot r_{N+x}]$$

After demodulation, the MRC processing result can be obtained by accumulating d0, d1 of each finger in the signal combination block of the RAKE receiver. The data symbols are assumed to be encoded in the STTD scheme, and it is also assumed that the data block does not need to transmit continuously, thus the equations can also apply to the P-CCPCH using STTD encoding in a WCDMA standard.

If the symbol time is less than the coherent integration time of symbol despreading, the data symbols are estimated using the conventional demodulation equations by substituting the received signal r0 and r1, and the corresponding estimated path gains h0 and h1.

$$d0 \propto (|h0|^2 + |h1|^2) \cdot (h0^* \cdot r0 + h1 \cdot r1^*)$$

$$d1 \propto (|h0|^2 + |h1|^2) \cdot (-h1 \cdot r0^* + h0^* \cdot r1)$$

If the data channel for demodulation is operated in general mode, the system processes the input of each finger according to the rules described in the following.

If the symbol time is approaching or longer than the coherent integration time of symbol despreading, then the corresponding data block (d0, d1) is divided into N portions, $r0_0, r_1, \ldots, r_{N-1}$. The phase is adjusted according to the path gain estimations of the transmitted signal, $h0_0, h0_1, \ldots, h0_{N-1}$, to obtain the data symbol d0. The formula is shown as the following:

$$d0 = \sum_{x=0}^{N-1} |h0_x|^2 h0_x^* \cdot r_x$$

If the symbol time is much less than the coherent integration time of symbol despreading, then the system despread the signal to obtain r0 according to the conventional method. The phase is adjusted according to the path gain estimation of the transmitted signal h0, and the data symbol d0 can be obtained using the formula shown below.

$$d0 = r0 \cdot h0^*$$

Figure 1:
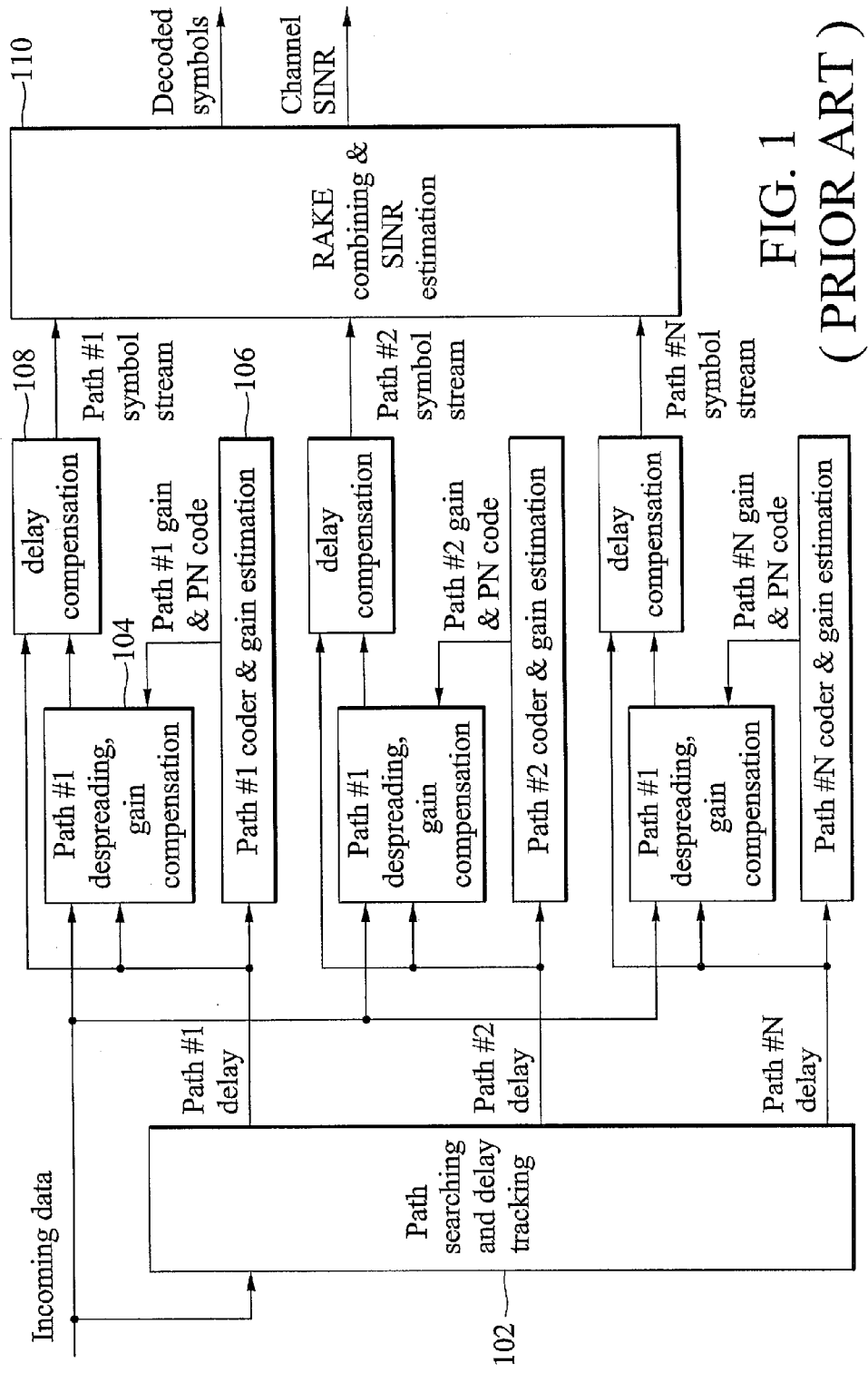
FIG. 1 is a block diagram of a RAKE receiver of a spread spectrum system of the related art.
Figure 2A:
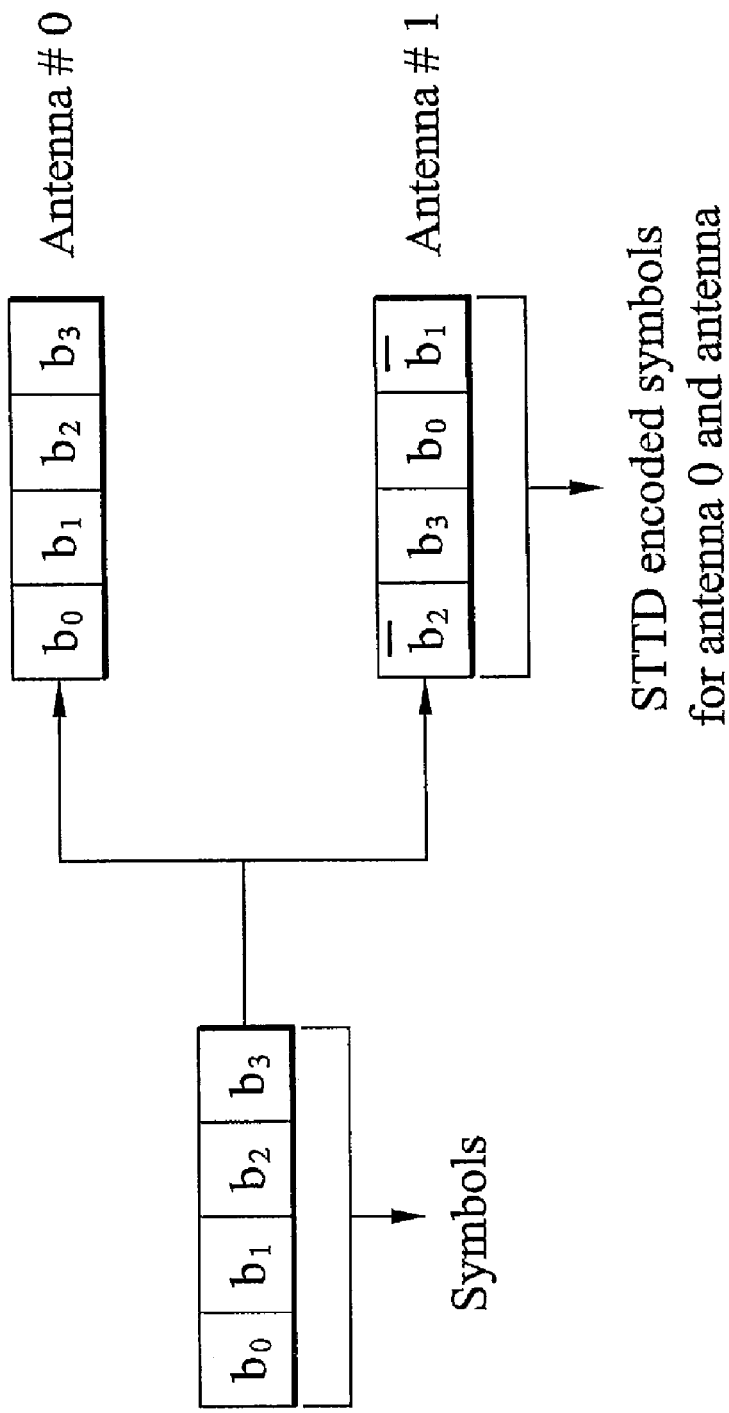
FIG. 2(a) shows STTD encoding at bit level in a WCDMA system.
Figure 2B:
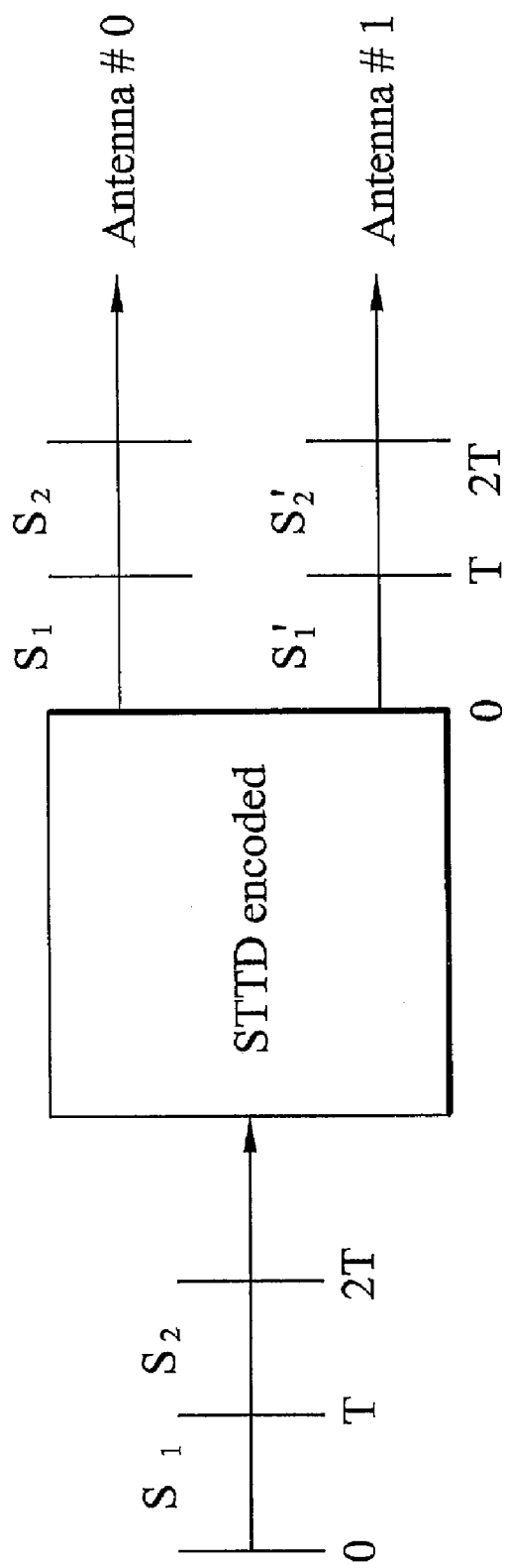
FIG. 2(b) shows STTD encoding at symbol level in a WCDMA system.
Figure 3A:
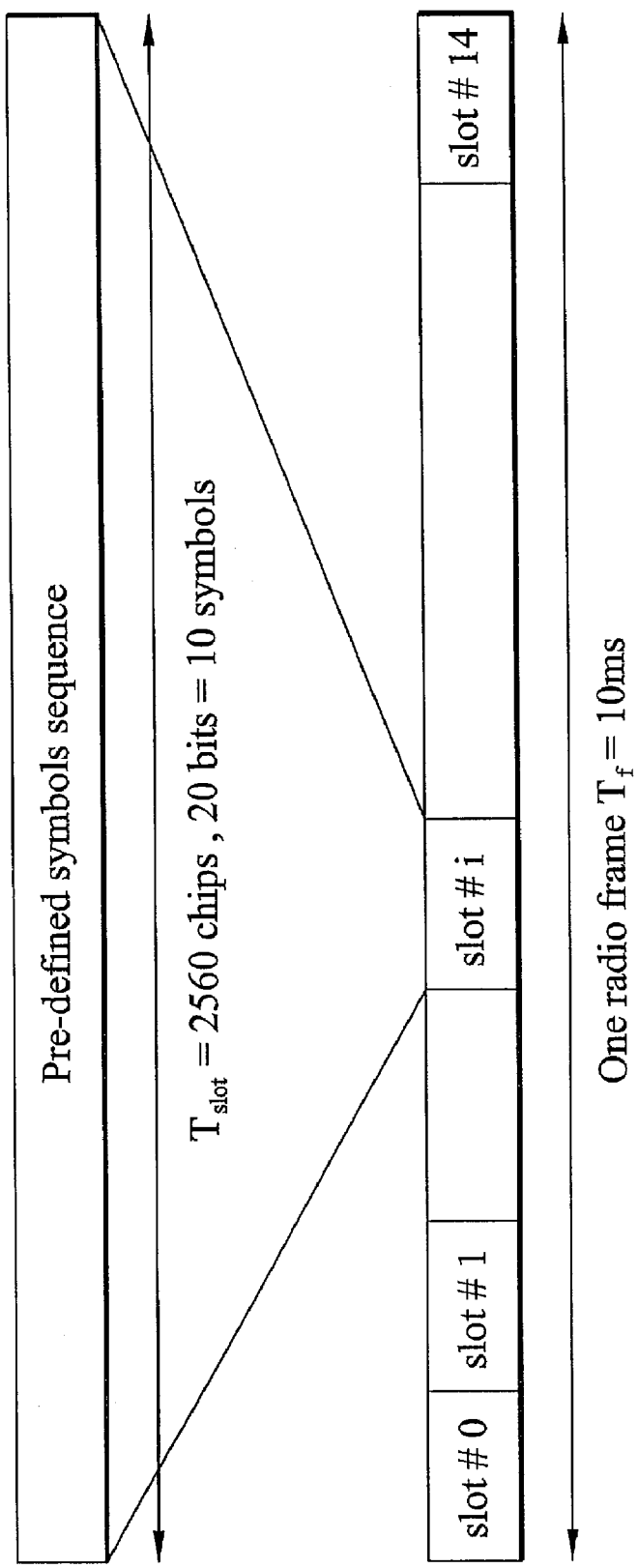
FIG. 3(a) shows the frame structure of a CPICH frame.
Figure 3B:
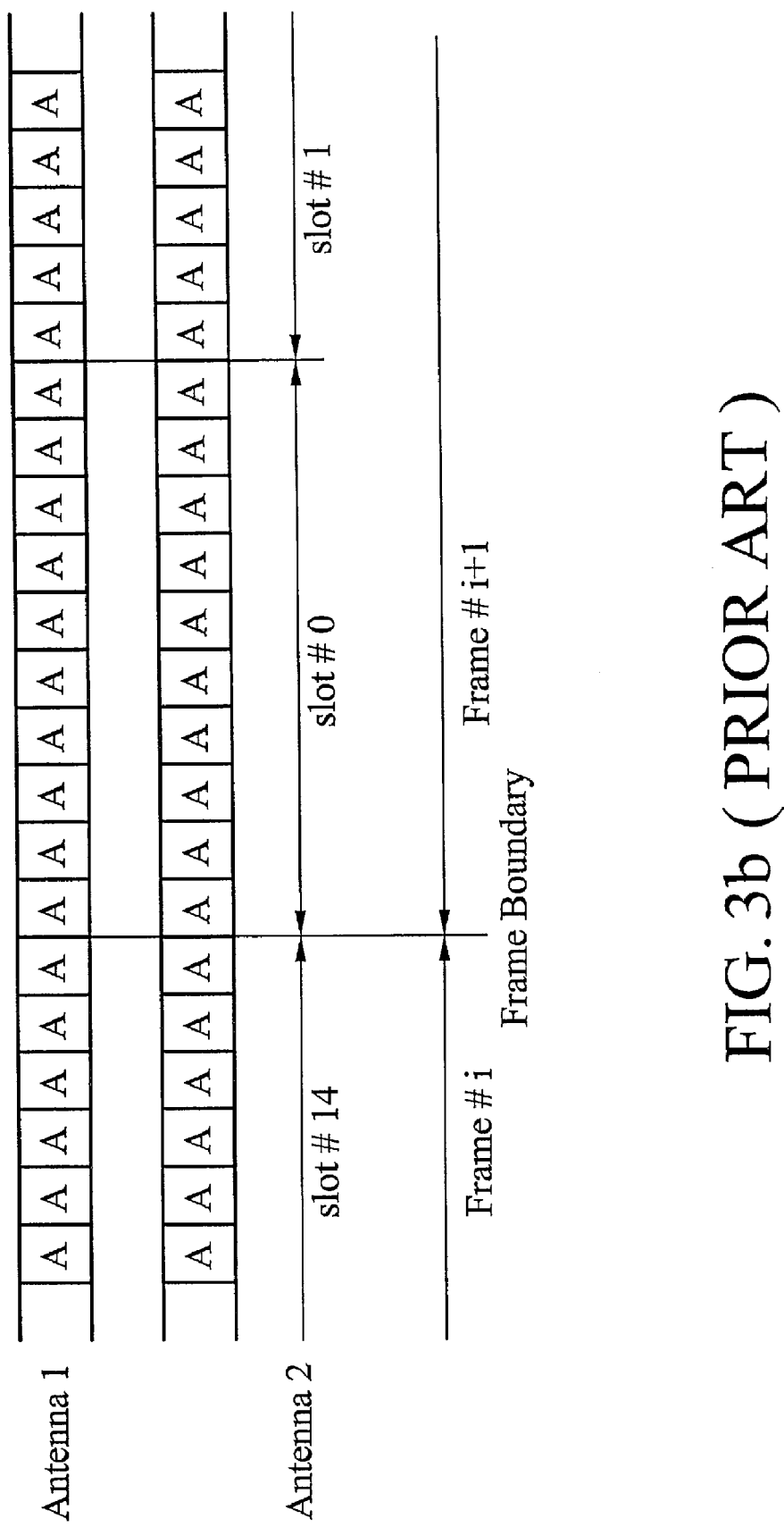
FIG. 3(b) shows the modulation pattern of CPICH symbol sequences transmitted by antenna 1 and antenna 2.
Figure 4:
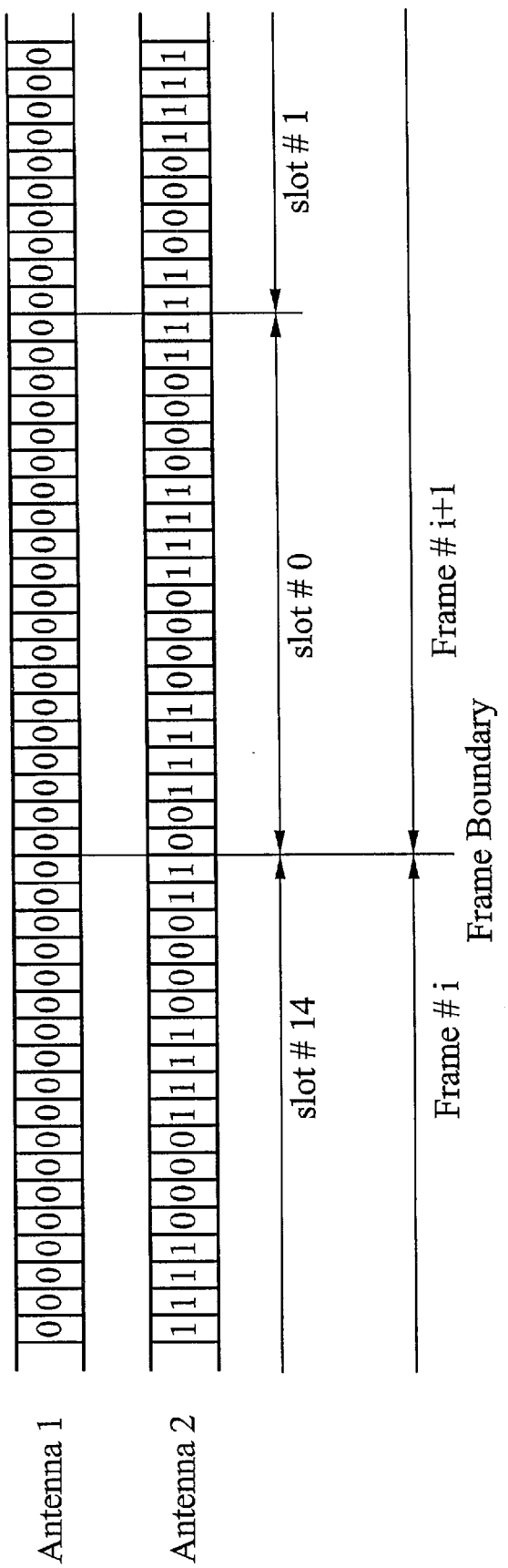
FIG. 4 shows the transmission bits of CPICH sequences transmitted by antenna 1 and antenna 2.
Figure 5:
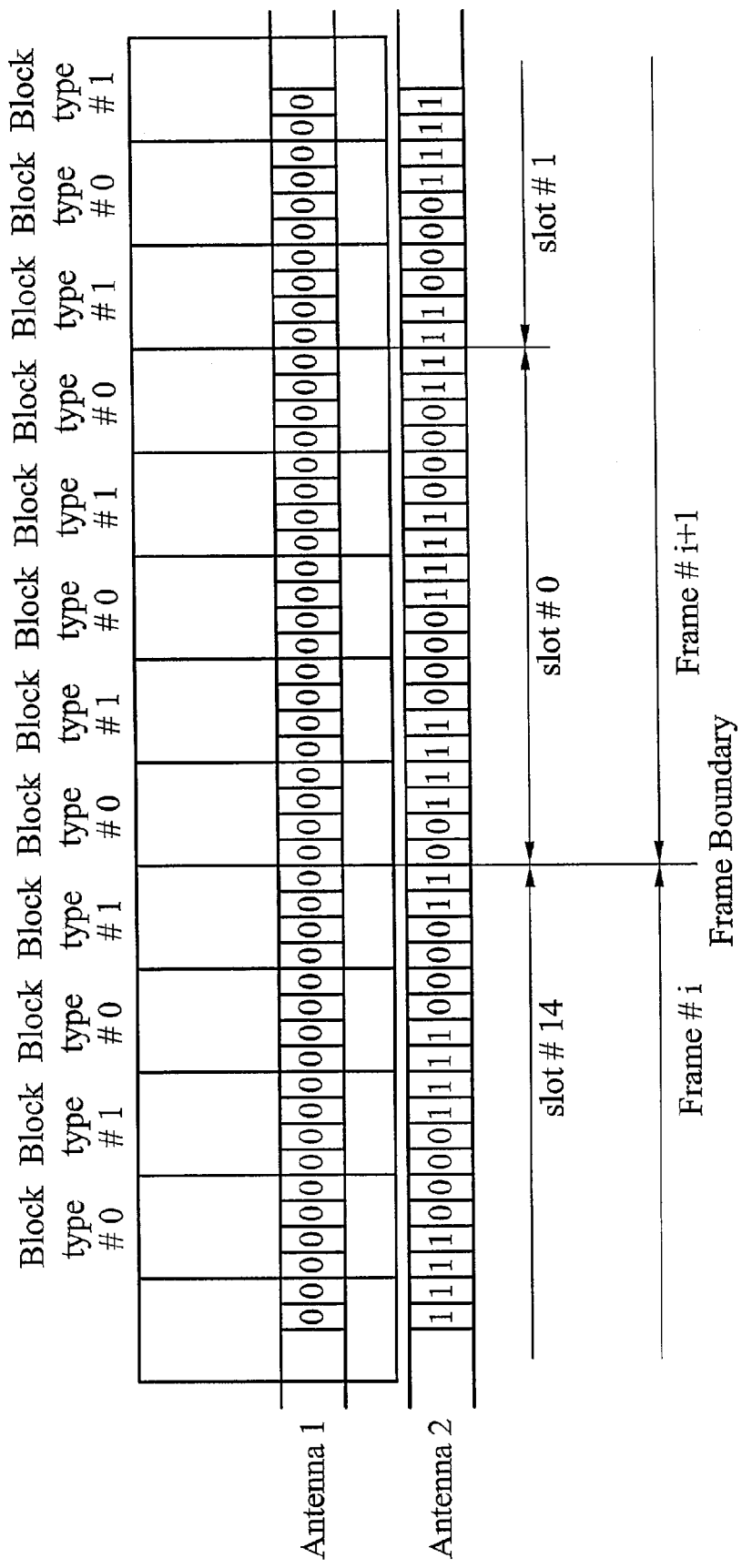
FIG. 5 shows the two block types in pilot (CPICH) sequences transmitted by antenna 1 and antenna 2.
Figure 6:
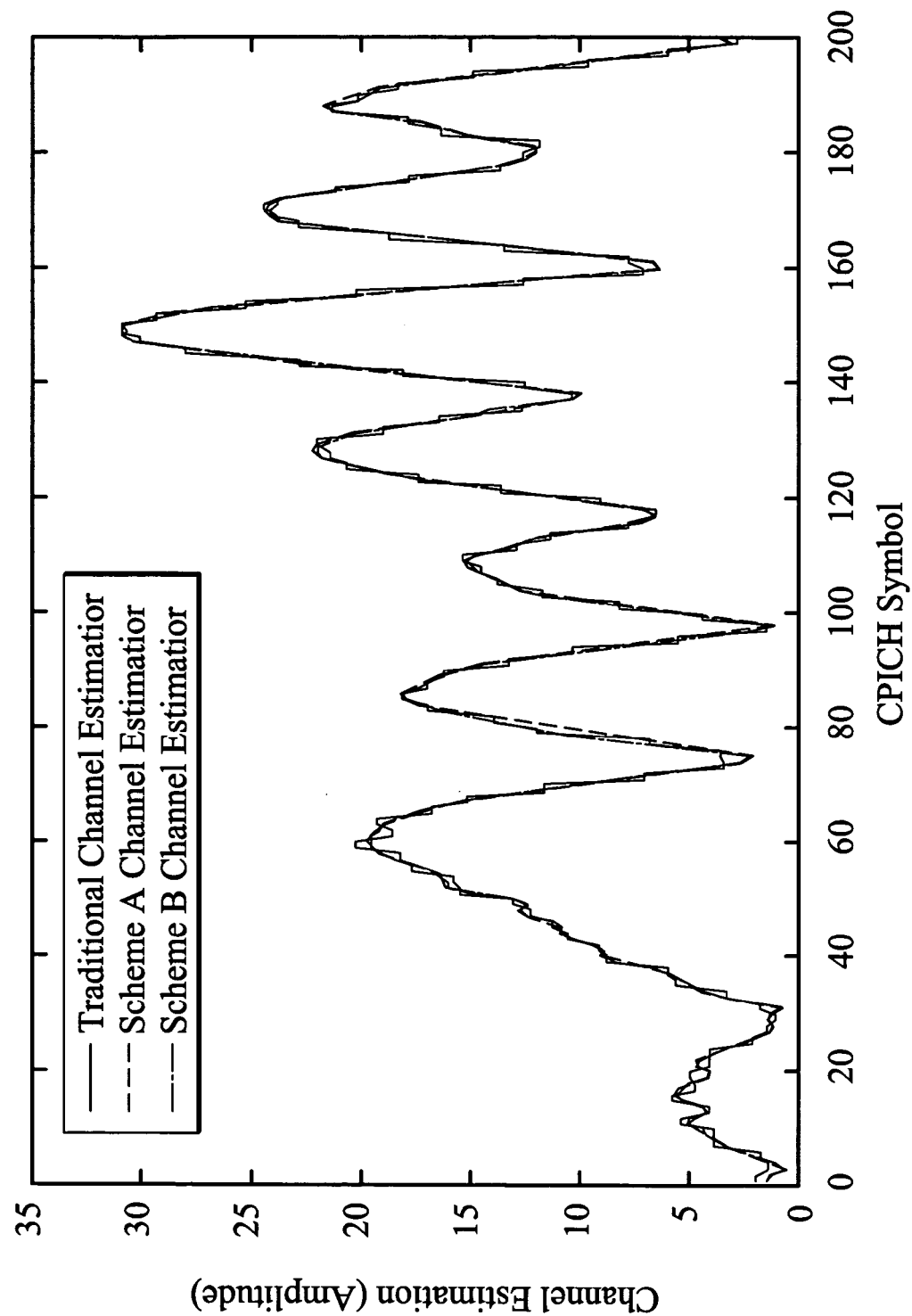
FIG. 6 shows a simulation result of path gain estimation under Doppler Effect ($f_{Doppler}$=460 Hz)

FIG. 6 shows a simulation result of the path gain estimations under Doppler shift effect. The output of the path gain estimation cannot track the channel properly under fast fading condition as the conventional path estimation method assumes constant channel response for the entire block. The error of the conventional estimation method is therefore greater than the error generated by the estimation method of the present invention. The simulation result shows that the output of the path gain estimation of the present invention can track the channel variation symbol by symbol.

Figure 7:
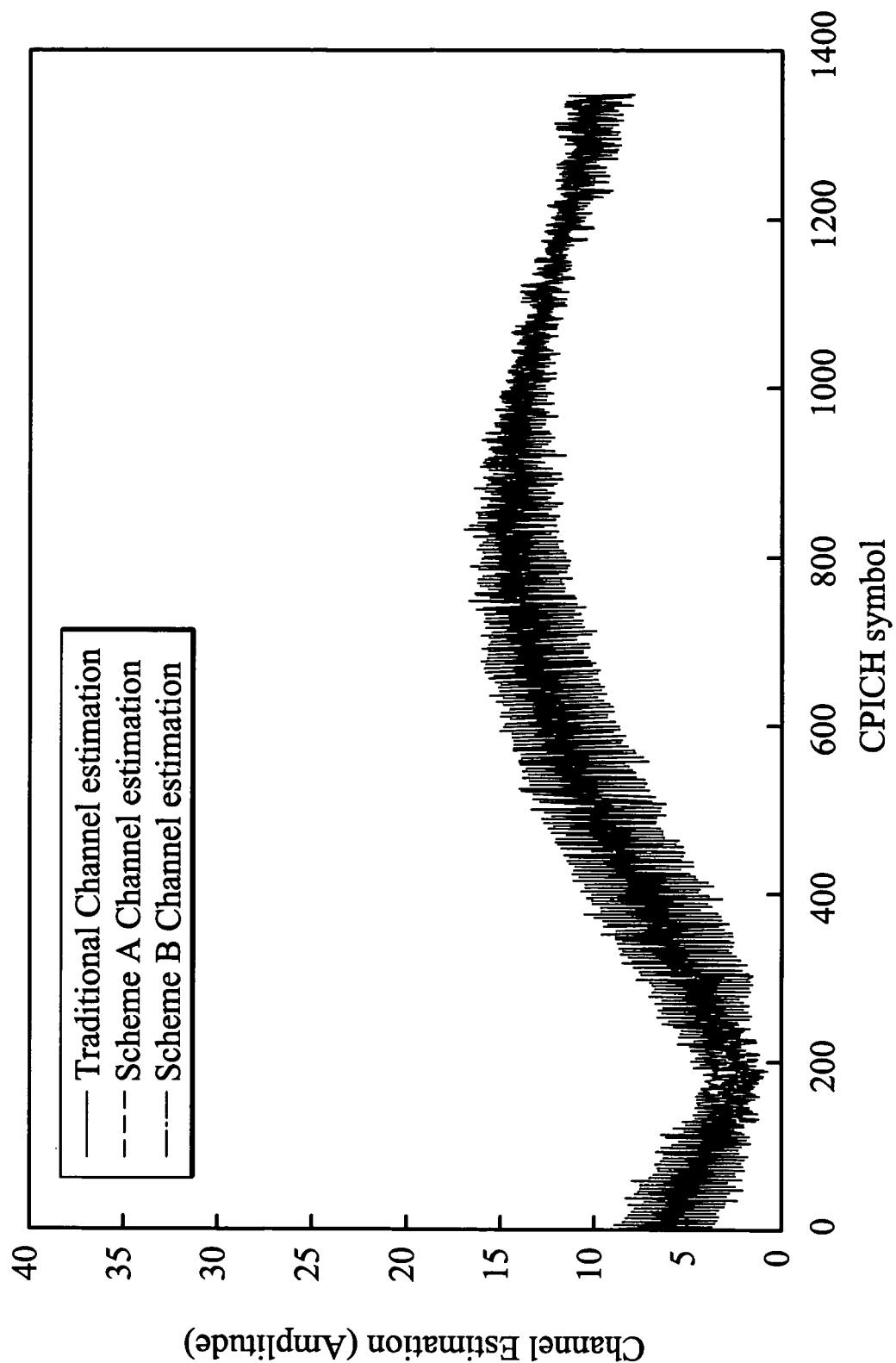
FIG. 7 shows a simulation result of CPICH path gain estimation.

FIG. 7 shows a simulation result of path gain estimation for a traditional block type STTD path estimation and the filter-type continuous path gain estimation of the present invention by using CPICH symbols at CFO=0.3 ppm (600 Hz). The simulation result of the present invention performs better than the traditional method under a carrier frequency offset, and furthermore there is only a small error in the path gain estimation of the present invention.

The present invention is not only limited to the path gain estimation algorithm with STTD (space-time transmit diversity) scheme, but can also be used in other path gain estimation algorithms employed in communication devices with the RAKE receiving scheme to overcome the multipath fading effect.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of path gain estimation for a downlink WCDMA (Wideband Code Division Multiple Access) system, the method comprising the following steps:

encoding OPICH (Common Pilot Channel) symbols into a first pilot symbol sequence and a second pilot symbol sequence;

transmitting the first and the second pilot symbol sequence by a first antenna and a second antenna respectively;

receiving signals by a third antenna of a receiver;

decoding and despreading the received signals into received CPICH symbols; and determining the path gain by a STTD filter coefficient determination process comprising a block selection process for selecting a combination of the received CPICH symbols and a tap gain determination process for determining weighted values for the received CPICH symbols.

2. The method of path gain estimation as claimed in claim 1, wherein the block selection process further comprises:

obtaining simultaneous equations by choosing four symbol sets ($s0_a$, $s1_a$; $s0_{a+b}$, $s1_{a+b}$; $s0_{a+2b}$, $s1_{a+2b}$; $s0_{a+3b}$, $s1_{a+3b}$) corresponding to the received CPICH symbols ($r_a$, $r_{a+b}$, $r_{a+2b}$, $r_{a+3b}$);

wherein $s0_0, s0_1, s0_2, \ldots$ represent the first pilot symbol sequence transmitted by the first antenna, $s1_0, s1_1, s1_2, \ldots$ represent the second pilot symbol sequence transmitted by the second antenna, (a, a+b, a+2b, a+3b) represent timing indices of the symbols, and the timing indices are selected to obtain orthogonal weighted values for the simultaneous equations.

3. The method of path gain estimation as claimed in claim 2, wherein the simultaneous equations of the block selection process are:

$$r_a = s0_a \times (h0 - 3\Delta 0) + s1_a \times (h1 - 3\Delta 1)$$

$$= s0_a \times h0 - 3s0_{a+b} \times \Delta 0 + s1_a \times h1 - 3s1_{a+b} \times \Delta 1$$

$$r_{a+b} = s0_{a+b} \times (h0 - \Delta 0) + s1_{a+b} \times (h1 - \Delta 1)$$

$$= s0_{a+b} \times h0 - s0_{a+b} \times \Delta 0 + s1_{a+b} \times h1 - s1_{a+b} \times \Delta 1$$

$$r_{a+2b} = s0_{a+2b} \times (h0 + \Delta 0) + s1_{a+2b} \times (h1 + \Delta 1)$$

$$= s0_{a+2b} \times h0 + s0_{a+2b} \times \Delta 0 + s1_{a+2b} \times h1 + s1_{a+2b} \times \Delta 1$$

$$r_{a+3b} = s0_{a+3b} \times (h0 + 3\Delta 0) + s1_{a+3b} \times (h1 + 3\Delta 1)$$

$$= s0_{a+3b} \times h0 + 3s0_{a+3b} \times \Delta 0 + s1_{a+3b} \times h1 + 3s1_{a+3b} \times \Delta 1$$

wherein h0, h1, $\Delta 0$, $\Delta 1$ are the weighted values, (h0, h1) represent average transmitted path gains of the first and the second antennas respectively, and ($2\Delta 0$, $2\Delta 1$) represent increments of the path gains after a time spacing b.

4. The method of path gain estimation as claimed in claim 3, wherein the tap gain determination process comprises solving the simultaneous equations and estimating path gains of the first and the second antennas according to the average transmitted path gains and the increments of the path gains.

5. The method of path gain estimation as claimed in claim 4, wherein the tag gain determination process further comprises maintaining a constant sum of the weighted values for the received CPICH symbols.

6. The method of path gain estimation as claimed in claim 5, wherein the tap gain determination process further comprises assigning a simple constant or an integer to each weighted value for reducing computational complexity.

7. The method of path gain estimation as claimed in claim 6, wherein the tap gain determination process further comprises setting the weighted values to compensate the path gain estimation jitter caused by carrier frequency offsets.

8. A system of path gain estimation for a downlink WCDMA (Wideband Code Division Multiple Access) system comprising:
  a transmitting device, comprising:
    a STTD encoder for encoding CPICH (Common Pilot Channel) symbols into a first and a second pilot symbol sequences based on the STTD scheme;
    a first antenna for transmitting the first pilot symbol sequence; and
    a second antenna for transmitting the second pilot symbol sequence;
  a receiving device, comprising:
    a third antenna for receiving signals; and
    an STTD decoder for decoding and despreading the received signals into received CPICH symbols; and
    a block selection unit for choosing a combination of the received CPICH symbols; and
    a tap gain determination unit for determining weighted values corresponding to the received CPICH symbols.

9. The system of path gain estimation as claimed in claim 8, wherein the block selection unit obtains simultaneous equations by choosing four symbol sets ($s0_a$, $s1_a$; $s0_{a+b}$, $s1_{a+b}$; $s0_{a+2b}$, $s1_{a+2b}$; $s0_{a+3b}$, $s1_{a+3b}$) corresponding to the received CPICH symbols ($r_a$, $r_{a+b}$, $r_{a+2b}$, $r_{a+3b}$);
  wherein $s0_0$, $s0_1$, $s0_2$, ... represent the first pilot symbol sequence transmitted by the first antenna, $s1_0$, $s1_1$, $s1_2$, ... represent the second pilot symbol sequence transmitted by the second antenna, (a, a+b, a+2b, a+3b) represent timing indices of the symbols, and the timing indices are selected to obtain orthogonal weighted values for the simultaneous equations.

10. The system of path gain estimation as claimed in claim 9, wherein the simultaneous equations of the block selection process are:

$$r_a = s0_a \times (h0 - 3\Delta 0) + s1_a \times (h1 - 3\Delta 1)$$

$$= s0_a \times h0 - 3s0_{a+b} \times \Delta 0 + s1_a \times h1 - 3s1_{a+b} \times \Delta 1$$

$$r_{a+b} = s0_{a+b} \times (h0 - \Delta 0) + s1_{a+b} \times (h1 - \Delta 1)$$

$$= s0_{a+b} \times h0 - s0_{a+b} \times \Delta 0 + s1_{a+b} \times h1 - s1_{a+b} \times \Delta 1$$

$$r_{a+2b} = s0_{a+2b} \times (h0 + \Delta 0) + s1_{a+2b} \times (h1 + \Delta 1)$$

$$= s0_{a+2b} \times h0 + s0_{a+2b} \times \Delta 0 + s1_{a+2b} \times h1 + s1_{a+2b} \times \Delta 1$$

$$r_{a+3b} = s0_{a+3b} \times (h0 + 3\Delta 0) + s1_{a+3b} \times (h1 + 3\Delta 1)$$

$$= s0_{a+3b} \times h0 + 3s0_{a+3b} \times \Delta 0 + s1_{a+3b} \times h1 + 3s1_{a+3b} \times \Delta 1$$

wherein h0, h1, $\Delta 0$, $\Delta 1$ are the weighted values, (h0, h1) represent average transmitted path gains of the first and the second antennas respectively, and ($2\Delta 0$, $2\Delta 1$) represent increments of the path gains after a time spacing b.

11. The system of path gain estimation as claimed in claim 10, wherein the tap gain determination unit solves the simultaneous equations and estimates path gains of the first and the second antennas according to the average transmitted path gains and the increments of the path gains.

12. The system of path gain estimation as claimed in claim 11, wherein the tag gain determination unit maintains sum of the weighted values for the received CPICH symbols to be constant.

13. The system of path gain estimation as claimed in claim 12, wherein the tap gain determination unit assigns a simple constant or an integer to each weighted value for reducing computational complexity.

14. The system of path gain estimation as claimed in claim 13, wherein the tap gain determination unit sets the weighted values to compensate the path gain estimation jitter caused by carrier frequency offsets.

15. An apparatus of path gain estimation for a downlink WCDMA (Wideband Code Division Multiple Access) system, wherein the apparatus comprises:
  means for encoding CPICH (Common Pilot Channel) symbols into a first pilot symbol sequence and a second pilot symbol sequence;
  means for transmitting the first and the second pilot symbol sequence by a first antenna and a second antenna respectively;
  means for receiving signals by a third antenna of a receiver;
  means for decoding and despreading the received signals into received CPICH symbols; and
  means for determining the path gain which performs a STTD filter coefficient determination process comprising a block selection process for selecting a combination of the received CPICH symbols and a tap gain determination process for determining weighted values for the received CPICH symbols.

16. The apparatus of path gain estimation as claimed in claim 15, wherein the block selection process performed by the means for determining the path gain further comprises:
  obtaining simultaneous equations by choosing four symbol sets ($s0_a$, $s1_a$; $s0_{a+b}$, $s1_{a+b}$; $s0_{a+2b}$, $s1_{a+2b}$; $s0_{a+3b}$, $s1_{a+3b}$) corresponding to the received CPICH symbols ($r_a$, $r_{a+b}$, $r_{a+2b}$, $r_{a+3b}$);
  wherein $s0_0$, $s0_1$, $s0_2$, ... represent the first pilot symbol sequence transmitted by the first antenna, $s1_0$, $s1_1$, $s1_2$, ... represent the second pilot symbol sequence transmitted by the second antenna, (a, a+b, a+2b, a+3b) represent timing indices of the symbols, and the timing indices are selected to obtain orthogonal weighted values for the simultaneous equations.

17. The apparatus of path gain estimation as claimed in claim 16, wherein the simultaneous equations of the block selection process are:

$$r_a = s0_a \times (h0 - 3\Delta 0) + s1_a \times (h1 - 3\Delta 1)$$

$$= s0_a \times h0 - 3s0_{a+b} \times \Delta 0 + s1_a \times h1 - 3s1_{a+b} \times \Delta 1$$

$$r_{a+b} = s0_{a+b} \times (h0 - \Delta 0) + s1_{a+b} \times (h1 - \Delta 1)$$

$$= s0_{a+b} \times h0 - s0_{a+b} \times \Delta 0 + s1_{a+b} \times h1 - s1_{a+b} \times \Delta 1$$

$$r_{a+2b} = s0_{a+2b} \times (h0 + \Delta 0) + s1_{a+2b} \times (h1 + \Delta 1)$$

$$= s0_{a+2b} \times h0 + s0_{a+2b} \times \Delta 0 + s1_{a+2b} \times h1 + s1_{a+2b} \times \Delta 1$$

$$r_{a+3b} = s0_{a+3b} \times (h0 + 3\Delta 0) + s1_{a+3b} \times (h1 + 3\Delta 1)$$

$$= s0_{a+3b} \times h0 + 3s0_{a+3b} \times \Delta 0 + s1_{a+3b} \times h1 + 3s1_{a+3b} \times \Delta 1$$

wherein h0, h1, $\Delta 0$, $\Delta 1$ are the weighted values, (h0, h1) represent average transmitted path gains of the first and the second antennas respectively, and ($2\Delta 0$, $2\Delta 1$) represent increments of the path gains after a time spacing b.

18. The apparatus of path gain estimation as claimed in claim 17, wherein the tap gain determination process performed by the means for determining the path gain comprises solving the simultaneous equations and estimating path gains of the first and the second antennas according to the average transmitted path gains and the increments of the path gains.

19. The apparatus of path gain estimation as claimed in claim 18, wherein the tag gain determination process performed by the means for determining the path gain further comprises maintaining a constant sum of the weighted values for the received CPICH symbols.

20. The apparatus of path gain estimation as claimed in claim 19, wherein the tap gain determination process performed by the means for determining the path gain further comprises assigning a simple constant or an integer to each weighted value for reducing computational complexity.

21. The apparatus of path gain estimation as claimed in claim 20, wherein the tap gain determination process performed by the means for determining the path gain further comprises setting the weighted values to compensate the path gain estimation jitter caused by carrier frequency offsets.

* * * * *